(12) United States Patent
Dhruv et al.

(10) Patent No.: US 8,096,138 B2
(45) Date of Patent: Jan. 17, 2012

(54) BOTTLE PASTEURIZER AND METHOD

(75) Inventors: Ashok Shashikant Dhruv, Englewood, CO (US); Amos Rei-Young Wu, Palatine, IL (US)

(73) Assignee: Stokely-Van Camp, Inc., Chicago, IL (US)

( * ) Notice: Subject to any disclaimer, the term of this patent is extended or adjusted under 35 U.S.C. 154(b) by 1147 days.

(21) Appl. No.: 11/440,939

(22) Filed: May 24, 2006

(65) Prior Publication Data

US 2007/0082100 A1    Apr. 12, 2007

Related U.S. Application Data

(63) Continuation-in-part of application No. 11/245,627, filed on Oct. 7, 2005, now Pat. No. 7,464,559.

(51) Int. Cl.
*F28D 3/00* (2006.01)
*A23L 3/18* (2006.01)
*A23L 3/10* (2006.01)
*A23L 3/26* (2006.01)

(52) U.S. Cl. ............ 62/171; 99/470; 426/407; 426/521; 426/524

(58) Field of Classification Search ............ 62/171, 62/64; 426/232, 407, 405, 520, 521, 524; 99/467, 470; 165/66
See application file for complete search history.

(56) References Cited

U.S. PATENT DOCUMENTS

| | | | | |
|---|---|---|---|---|
| 4,849,235 A | * | 7/1989 | Braymand | 426/232 |
| 5,630,321 A | * | 5/1997 | Miller | 62/63 |
| 2002/0129921 A1 | * | 9/2002 | Frank et al. | 164/414 |

* cited by examiner

*Primary Examiner* — Chen-Wen Jiang
(74) *Attorney, Agent, or Firm* — Banner & Witcoff, Ltd.

(57) ABSTRACT

An improved method and apparatus for pasteurizing filled food containers having contents to be pasteurized includes spraying a heat transfer fluid onto the containers. As the contents increase in temperature, the flow rate of heat transfer fluid is decreased. The heat transfer fluid is at least about 20° F. hotter than the initial average temperature of the contents. In one embodiment, the temperature of the spent heat transfer fluid typically does not vary more than about 6° F. to 9° F.

20 Claims, 2 Drawing Sheets

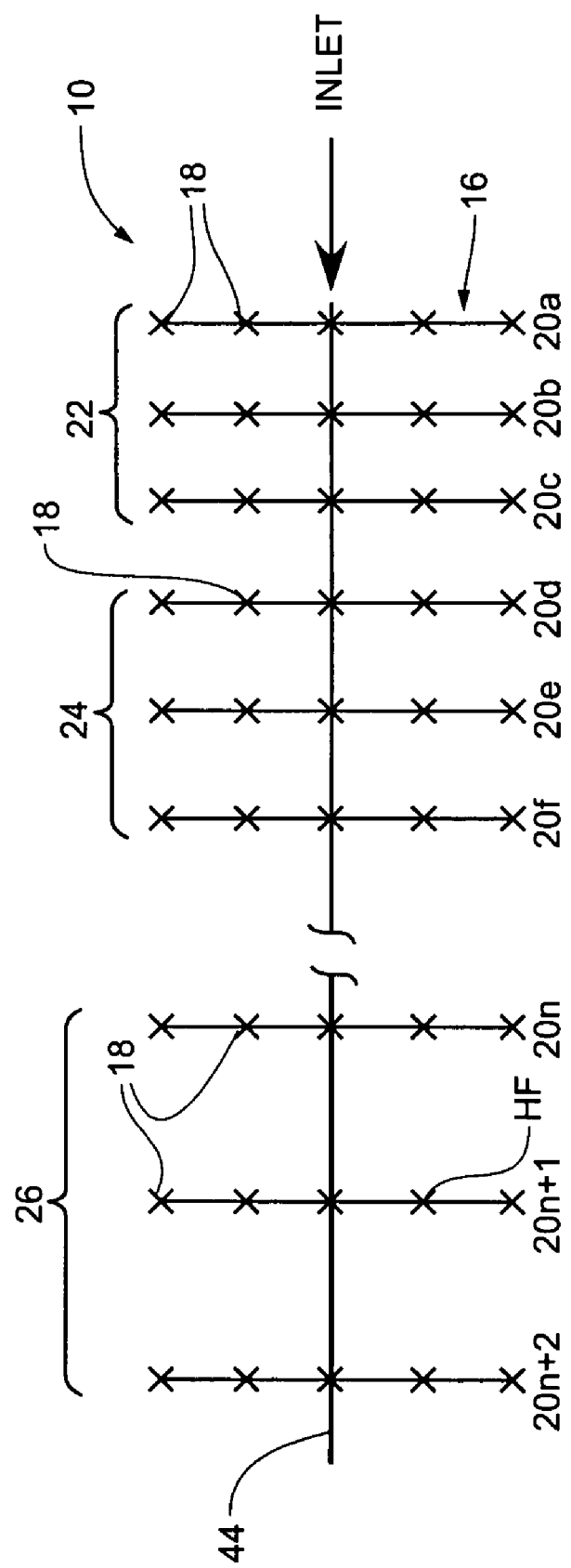

BOTTLE PASTEURIZER AND METHOD

CROSS-REFERENCE TO RELATED APPLICATION

This is a continuation-in-part of U.S. patent application Ser. No. 11/245,627, filed on Oct. 7, 2005 now U.S. Pat. No. 7,464,559, and incorporated herein by reference.

TECHNICAL FIELD

The invention is directed to an improved bottle pasteurizer device and method for pasteurizing bottles or containers by spraying a heat transfer fluid onto the containers.

BACKGROUND OF THE INVENTION

Numerous types of foods, including beverages, are packed in cans or glass or PET bottles and are heated or need to be pasteurized. The result is a container of food that needs to be heated to pasteurization temperatures.

Generally, it is highly desirable to heat the containers of food to pasteurization temperatures quickly. First, some foods may degrade if they are exposed to high temperatures for too long due to overcooking or chemical reactions, sometimes with the container.

Prior art container pasteurizing methods have not been designed to pasteurize bottles efficiently and quickly. They often contain multiple heating zones, where each zone uses heat transfer fluids heated to different temperatures. In some cases, a heat transfer fluid is sprayed in one zone, collected, and sprayed in a second zone so that the flow of containers relative to the flow of heat transfer fluid approximates countercurrent flow. Although countercurrent flow is very efficient in liquid-liquid heat exchangers, countercurrent flow is very inefficient for this application. Countercurrent flow requires multiple pumps, controls, and more complicated piping to be implemented for the purpose of pasteurizing containers. Hence, there remains a need to pasteurize containers more efficiently and with less equipment.

SUMMARY OF THE INVENTION

In one embodiment, a method for pasteurizing filled food containers is provided. As used herein, the term "food" or "foods" includes "beverage" or "beverages," respectively. The beverage may be a sports drink, fruit drink, fruit juice, water, carbonated water, flavored waters, iced teas, iced coffees, formulated milk, soy milk, beer, or any other beverage that undergoes pasteurization. The containers have refrigerated, room temperature, or hot contents that require pasteurization. The method includes spraying a hot heat transfer fluid onto the containers. The container contents have an initial average temperature. Typically, the heat transfer fluid is at least 20° F., and more typically 40° F., hotter than the initial average temperature of the contents. The method also includes decreasing the flow rate of the heat transfer fluid as the average temperature of the contents increases. The contents of the heated container are kept at an elevated temperature for a period of time long enough to accomplish pasteurization of the contents.

In one embodiment, a second method for pasteurizing filled food containers is provided. The containers have room temperature or hot contents that require pasteurization. The method includes spraying a hot heat transfer fluid onto the containers. The container contents have an initial average temperature. The method includes decreasing the flow rate of the heat transfer fluid as the average temperature of the contents increases. Preferably, the temperature of the heat transfer fluid effluent, the heat transfer fluid after it has completed its contact with the bottles, does not vary more than about 6° F. to 9° F. throughout the system, including during the time it takes to increase the average temperature of the contents by about 45° F. or more, or more preferably by about 60° F. or more. The contents of the heated container are kept at an elevated temperature for a period of time long enough to accomplish pasteurization of the contents.

In an alternate embodiment, an apparatus for pasteurizing containers having contents that require pasteurization is provided. The apparatus includes a conveyor for conveying the containers having contents that require pasteurization and spray nozzles. The spray nozzles are placed and directed for spraying a hot heat transfer fluid onto the containers on the conveyor. The spray nozzles are spaced apart. They have a size corresponding to a flow rate capacity. The spacing and sizing of the spray nozzles are selected so that the flow rate of heat transfer fluid decreases in the direction of movement of the conveyor.

By having a high initial flow rate, the heating of containers occurs more rapidly initially when the temperature of the containers is coolest. As the containers heat, less hot heat transfer fluid is sprayed because it is not efficient to use the same initial flow rate of heat transfer fluid. Because the pasteurization occurs rapidly and efficiently, the amount of space and conveying equipment necessary to heat the containers to pasteurization temperatures is minimized. Because the conveying equipment represents the bulk of the cost of purchasing and maintenance of a bottle pasteurizer, the invention provides substantial savings in the capital and operating costs of a can or bottle pasteurizer.

BRIEF DESCRIPTION OF THE DRAWINGS

FIG. 2 is a schematic plan view of the bottle pasteurizer device in the plane of the spray.

DETAILED DESCRIPTION OF THE INVENTION

Figure 1:
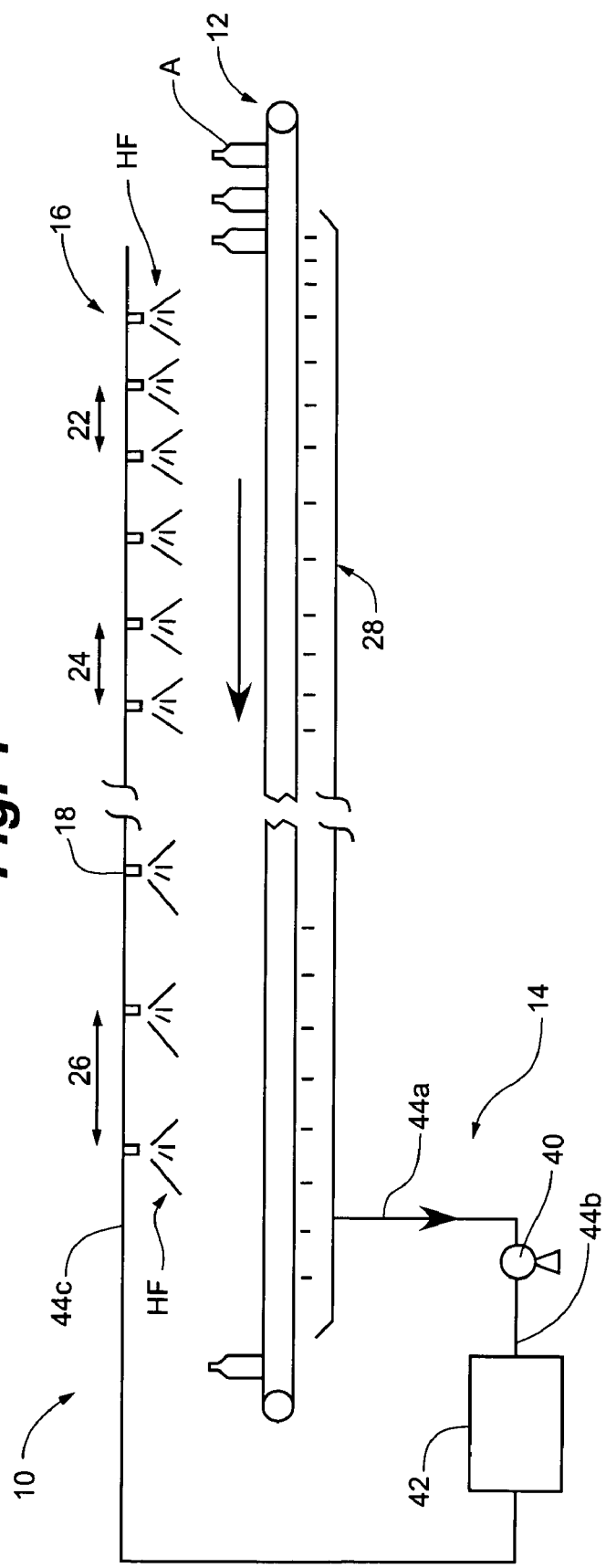
FIG. 1 is a schematic elevational view of a bottle pasteurizer device of the invention.

Referring to the Figures generally, there is illustrated a bottle pasteurization system 10 in accordance with the invention. Bottle pasteurization system 10 is composed of a conveyor 12, a heat transfer fluid supply and collection system 14, and a water spray system 16.

Conveyor 12 is shown schematically in FIG. 1. Any suitable conveyor known in the art to convey containers A can be utilized. Consequently, a detailed description of conveyor 12 is not provided. Conveyor 12 is suitably positioned beneath spray system 16 so that containers A contained thereon are sprayed with heat transfer fluid HF. Preferably, conveyor 12 has a belt which is perforated or grooved so that heat transfer fluid HF sprayed onto the containers can drain therethrough. Typically, conveyor 12 is wide enough to allow a plurality of containers A to be placed across the width of conveyor 12.

Water spray system 16 is an important part of the present invention. As illustrated, water spray system 16 includes a plurality of spray nozzles 18 for spraying heat transfer fluid HF onto containers A located on conveyor 12. Spray nozzles 18 are generally located above conveyor 12 and extend therealong. Spray nozzles 18 can be any nozzles suitable for spraying heat transfer fluid onto containers. For example, spray nozzles 18 can be hollow cone or fan nozzles, among others. The spray nozzles can be positioned to deliver the heat transfer fluid flow parallel to the vertical surface of the container A or, if desired, at a suitable angle to this vertical surface. Preferably, spray nozzles 18 are arranged to provide uniform coverage of heat transfer fluid across a particular width of conveyor 12 so that containers A located in different positions along a particular width of conveyor 12 receive substantially the same amount of heat transfer fluid HF so that each bottle A is cooled substantially equally.

Generally, spray nozzles 18 are arrayed in rows $20a$-$20f$ ... $20_n$-$20_{n+2}$ across the width of conveyor 12 as shown in FIG. 2. Rows 20 are spaced apart at increasing intervals in the direction of travel of conveyor 12. With reference to FIGS. 1 and 2, intervals 22, 24 and 26 are shown. Preferably there are at least three different zones or intervals, more preferably at least four, even more preferably at least five, and most preferably at least six zones, each zone having a predetermined heat transfer fluid flow rate or spray density, with the heat transfer fluid flow rate decreasing in each downstream zone compared to the upstream zone or zones. The increased longitudinal spacing decreases the spray density and flow rate of heat transfer fluid in the direction of movement of conveyor 12. More preferably, the spacing of the nozzles 18 increases substantially exponentially in the direction of movement of conveyor 12. For reasons of practicality, typically it is sufficient for the spacing to be increased in six and twelve-inch intervals for the spacing to increase substantially exponentially. Most preferably, the spacing is such that the flow rate of heat transfer fluid HF within the interval is substantially proportional to the difference between the temperature of the heat transfer fluid HF and the average temperature of the contents within the interval. Such a spacing is believed to produce a rapid rate of initial pasteurization while efficiently decreasing the flow where higher flows would not be as efficient.

Typically, the spray density (or flow rate) decreases 60-90% between the maximum spray intensity and the minimum spray intensity. More preferably, the spray density decreases 75-85% between the maximum spray intensity and the minimum spray intensity. Typically, the point of maximum intensity is at or near the point of initial spraying and the point of minimum intensity is at or near the end of spraying, and the minimum spray intensity exceeds the spray intensity where the rate of heat transfer decreases rapidly. A rapid decrease can occur when the coverage of heat transfer fluid HF over the bottles begins to not substantially cover all of the sides of a container A. A rapid decrease can also occur if heat transfer within the contents changes from convection to conduction. The point where decreases become non-economical can be determined by routine experimentation. Preferably, the spacing of the nozzles increases monotonically and consequently the spray density decreases monotonically. However, it is not necessary for this to be so to fall within the scope of the invention, although deviations from a monotonic decrease are generally believed to be less efficient.

Spray density is the flow rate of heat transfer fluid HF sprayed onto an area of a conveyor belt when bottles are not present. The spray density will vary from point to point due to the unequal distribution of heat transfer fluid from the spray nozzles and the varying overlap of sprays. Thus, it is important when calculating or measuring the spray density to use a representative spray density to characterize maximum, minimum and other spray densities. Generally, but not necessarily, the spray density is measured across the entire width of the conveyor and spans one or two intervals. Generally, when the flow rate of sprayed heat transfer fluid HF is discussed within the specification, spray density is also implied.

Alternatively or in addition, the number of spray nozzles 18 in rows 20 can be decreased in the direction of movement of conveyor 12 (not shown). Alternatively or in addition, the flow rate capacity of nozzles 18 can be decreased in the direction of movement of conveyor 12.

Heat transfer fluid supply and collection system 14 includes a sump 28, a pump 40, a heat exchanger 42, and supply piping 44a, 44b and 44c.

Preferably, the heat transfer fluid HF is collected, reheated and reused. This is commonly accomplished by sump 28 that collects spent heat transfer fluid HF after being sprayed through nozzles 18 and onto containers A to heat them and then falling through conveyor 12. From sump 28, the spent heat transfer fluid HF travels through piping 44a and is pumped via pump 40 through piping 44b and through heat exchanger 42, which is suitably heated by a heating fluid. Thereafter, heat transfer fluid HF is directed via piping 44c through nozzles 18. Means for reheating captured heat transfer fluid HF includes any heat exchange equipment such as a heat exchanger or radiator. Heat exchangers are preferred for heating shelf-stable food products.

Applicants have discovered that pasteurization of containers having contents that require pasteurization can be made greatly improved by maximizing the initial rate of heating of the containers. To maximize the heating rate, the flow rate of heat transfer fluid sprayed onto containers is maximized initially and preferably the temperature of the heat transfer fluid is approximately the same as the heat transfer fluid sprayed downstream on the same bottle. By taking the above measures, the temperature differential between the initial average temperature of the contents of a container and the sprayed heat transfer fluid is maximized thereby increasing the rate of initial heat transfer. Also, the turbulence of the heat transfer fluid washing over a container is maximized, increasing the rate of heat transfer. Perhaps most importantly, the increased rate of heat transfer tends to induce or increase convection within the container, thereby increasing the rate of heat transfer.

Heat transfer fluid HF can be any suitable liquid, commonly water, which can be sourced from a municipal water supply or a local water well, for example. Heat transfer fluid HF can be any fluid which is preferably at least about 105° F. hotter than the initial average temperature of the contents of a container, more preferably at least about 115° F., even more preferably at least about 125° F., still more preferably at least about 135° F., and most preferably at least about 145° F. Preferably, the heat transfer fluid is water due to its nontoxicity, low cost, and superior heat transfer characteristics. Potential heat transfer fluids also include hot water.

The containers can be of any shape. The containers can be of any material. The containers can have any suitable content including still and carbonated beverages, alcoholic and non-alcoholic beverages, and solid or non-solid foods enveloped in sauce, syrup, or other liquid. For example, the container can contain a functional beverage, such as one designed for athletes, or apple sauce or some other food product. The material of construction of the containers can be any material including plastic (PET, HDPE, etc.), glass and metal (tin, steel, aluminum, etc.).

In accordance with the invention, the flow rate of the heat transfer fluid is decreased as the average temperature of the contents of a container increases. Decreasing the flow rate of heat transfer fluid can be accomplished in any suitable manner. If the containers are stationary, spray nozzles can be used which allow different flow rates at different pressures. The flow rate can then be controlled by throttling back control valves as time passes. If the containers are conveyed, then the spray nozzles can be spaced at increasing distances in the direction of movement of a container. Also the spacing of spray nozzles in a direction perpendicular to the movement of the container can be increased as the bottles move downstream. In addition, nozzles having a lesser flow rate can also be used downstream or otherwise decreasing the flow rate through the nozzles can be accomplished. The same objective may also be accomplished by adjusting conveyer belt speed, increasing the conveyer belt speed proportional to temperature decline of the product.

Preferably the temperature of the heat transfer fluid being sprayed onto the containers does not vary more than about 9° F., more preferably less than about 7° F., even more preferably less than about 5° F., still more preferably less than about 3° F., and most preferably less than about 1° F. while a container is spray heated.

Preferably, the contents are heated from an average temperature of approximately 35° F. to 140° F. to approximately 140° F. to 200° F. or above. The starting and end temperatures are a function of the product being processed.

The heat transfer fluid flow rate preferably is decreased at least three times during the heating of a container, more preferably at least four times, even more preferably at least five times, and most preferably at least six times. Each of the heating flow rates defines a heating flow rate zone. Preferably, the decreases are such that the heat transfer fluid flow rate between successive heating flow rate zones decreases approximately exponentially during the heating of a container. In particular, it is most preferred that the heat transfer fluid flow rate be substantially proportional to the difference between the temperature of the heat transfer fluid and the average temperature of the contents. Typically, the heat transfer fluid flow rate in a particular heating flow rate zone is controlled such that the temperature of the heat transfer fluid effluent, or spent heat transfer fluid temperature, in each zone after completing contact with the containers in each heating flow rate zone does not vary more than about 6° F. to 9° F. Preferably, the heat transfer fluid flow rate in a particular heating flow rate zone is controlled such that the temperature of the heat transfer fluid effluent, or spent heat transfer fluid temperature, in each zone after completing contact with the containers in each heating flow rate zone does not vary more than about 6° F. More preferably, the flow rate is controlled so that the heat transfer fluid effluent temperature does not vary by more than 6° F. across two adjacent zones, even more preferably across three adjacent zones, and most preferably across four adjacent zones.

In one embodiment, the containers are made of metal cans and contain approximately 11 ounces. The contents are heated from an average temperature of approximately 41° F. to above approximately 180° F. within 10 minutes.

In another embodiment, the containers are conveyed through a spray of heat transfer fluid. The conveying can be done by a conveyor. The initial or maximum heat transfer fluid spray density at the entrance to the spray zone preferably exceeds about 9 gal/min/ft$^2$, more preferably about 12 gal/min/ft$^2$, and most preferably about 15 gal/min/ft$^2$. The average temperature of the contents preferably is heated by about 120° F. or more, more preferably by about 130° F. or more, and most preferably by about 140° F. or more through the spray area. The temperature of the heat transfer fluid effluent, the heat transfer fluid after it has been sprayed onto the containers, varies through the spray area preferably by less than about 9° F., more preferably less than about 6° F., even more preferably less than about 4° F., and most preferably less than about 2° F. The smaller the temperature variation of the heat transfer fluid effluent, the more optimal the relative flow rates of heat transfer fluid in the spray area.

The temperature of the heat transfer fluid after it contacts the containers decreases by transferring heat to the container contents. The heat transfer fluid is then reheated before being recycled. The temperature of the cooled heat transfer fluid can be determined by measuring the temperature of heat transfer fluid effluent collected under and across the width of conveyor 12 at different locations.

In another embodiment, an apparatus 10 for heating containers having contents to be pasteurized is provided. Apparatus 10 has conveyor 12 for conveying containers. Conveyor 12 can be any type of conveyor known in the art.

Preferably, the initial spray density (near the start of the conveyor) is in excess of 9 gal/min/ft$^2$. More preferably, it exceeds 12 gal/min/ft$^2$. Most preferably,. it exceeds 15 gal/min/ft$^2$.

Preferably the spacing and sizing of spray nozzles 18 is selected to heat metal can container A containing approximately 11 ounces of hot product from an average temperature of approximately 40° F. to above 200° F. within about 10 minutes.

Preferably, the spacing and sizing of spray nozzles 18 is selected so that the temperature of the spent heat transfer fluid does not vary more than about 6° F. through the spray zone wherein the average temperature of the hot contents increases by about 60° F. or more.

Typically, the method and apparatus of the invention is used to heat the contents of a container by at least about 20° F., and more typically by at least about 40° F.

The contents of a heated container are kept at an elevated temperature for a period of time long enough to accomplish pasteurization of the contents.

After pasteurization of the contents of a container, the contents may be cooled by any available cooling method. Cooling methods could include exposing the bottles to temperatures below the temperature of the contents of the container, such as ambient or below ambient temperatures, or spraying a coolant onto the container at a temperature lower than the temperature of the contents of the container.

EXAMPLE 1

A bottle pasteurization device in accordance with the invention for pasteurizing 200-400 bottles per minute was designed. The bottles will contain approximately 11 ounces of a sports beverage. The contents of the bottle will be heated from 40° F. to 180° F. The devices will have a single heat transfer fluid of heated water supply temperature for spraying water onto the bottles and a single sump connected to a heat exchanger. All of the spray nozzles will be connected to the same heat exchanger. There will be 40 bottles across the width of the conveyor.

Based on known heat transfer equations and empirical data for the specific bottle and beverage combination, the invention's bottle pasteurizers will have the characteristics and performance described in the table below.

|  | Example 1A | Example 1B | Example 1C | Example 1D |
|---|---|---|---|---|
| Flow/bottle (gal/bottle) | 2 | 3 | 2 | 2 |
| Total flow rate (gpm) | 600 | 900 | 600 | 600 |
| Flow rate from heat exchanger (gpm) | 600 | 900 | 600 | 600 |

-continued

|  | Example 1A | Example 1B | Example 1C | Example 1D |
|---|---|---|---|---|
| Length of belt (feet) | 51.3 | 57 | 62.7 | 68.4 |
| Bottle residence time (min) | 9 | 10 | 11 | 12 |
| Average temperature of heat transfer fluid in sump (° F.) | 174 | 176 | 174 | 176 |
| Average temperature of spent heat transfer fluid (° F.) | 174 | 176 | 174 | 176 |
| Overall heat transfer coefficient (BTU/hr/ft$^2$/° F.) | 68 | 65 | 60 | 55 |

While the invention has been described with respect to certain preferred embodiments, as will be appreciated by those skilled in the art, it is to be understood that the invention is capable of numerous changes, modifications, and rearrangements, and such changes, modifications, and rearrangements are intended to be covered by the following claims.

We claim:

1. A method for pasteurizing filled food containers having contents to be pasteurized, comprising:
   conveying containers down a direction of a conveyor, the containers having contents to be pasteurized;
   spraying a heat transfer fluid onto the containers having contents to be pasteurized using a plurality of nozzles spaced along the conveyor, the nozzles forming generally a row parallel to the direction of movement of the conveyor, the row receiving the heat transfer fluid from a pipe, the pipe being generally parallel to the direction of movement of the conveyor, the contents of the containers having an initial average temperature, and the heat transfer fluid being at least about 20° F. hotter than the initial average temperature, to heat the contents of the containers; and
   decreasing the flow rate of the heat transfer fluid as the average temperature of the contents increases, the spacing of the spray nozzles selected so that the flow rate of the heat transfer fluid decreases in the direction of movement of the conveyor.

2. The method of claim 1, wherein the temperature of the heat transfer fluid sprayed onto the containers does not vary more than 9° F. during the spraying of heat transfer fluid onto a container.

3. The method of claim 2, further comprising continuing the spraying at least until the contents of the containers reach a pasteurizing temperature, and wherein the contents are heated from an average temperature of approximately from 40° F. to 135° F. to above approximately from 140° F. to 180° F.

4. The method of claim 2, wherein the heat transfer fluid flow rate is decreased at least three times.

5. The method of claim 2, wherein the heat transfer fluid flow rate decreases approximately exponentially.

6. The method of claim 2, wherein the temperature of the heat transfer fluid effluent does not vary more than about 9° F.

7. The method of claim 1, wherein the container is made of plastic, wherein each container contains approximately 20 oz, and wherein the contents are heated from an average temperature of approximately 75° F. to above about 180° F. within about 8.5 to 13 minutes.

8. The method of claim 1, wherein the conveyor comprises a conveyer belt, wherein the heat transfer fluid is sprayed onto the containers while the containers are conveying down the conveyer belt.

9. The method of claim 8, wherein the heat transfer fluid spray density initially exceeds at least about 9 gal/min/ft$^2$.

10. The method of claim 8, wherein the temperature of the heat transfer fluid effluent does not vary more than about 6° F.

11. An apparatus for pasteurizing containers having contents to be pasteurized, comprising:
    a conveyor, having a direction of movement, for conveying containers having contents to be pasteurized; and
    spray nozzles, placed and directed for spraying a heat transfer fluid onto the containers, producing a heat transfer fluid effluent, the spray nozzles being spaced apart, the spray nozzles having a size corresponding to a flow rate capacity, the spacing of the spray nozzles selected so that the flow rate of the heat transfer fluid decreases in the direction of movement of the conveyor, the spray nozzles forming a row generally parallel to the direction of movement of the conveyor, the row receiving the heat transfer fluid from a pipe, the pipe being generally parallel to the direction of movement of the conveyor.

12. The apparatus of claim 11, wherein the spray nozzles are connected to a single source of heat transfer fluid.

13. The apparatus of claim 11, wherein the flow rate of heat transfer fluid decreases at least three times in the direction of movement of the conveyor.

14. The apparatus of claim 11, wherein the spray nozzles have substantially the same size and the spacing of the nozzles increases exponentially in the direction of movement of the conveyor.

15. The apparatus of claim 11, further comprising:
    a sump, sized and positioned for capturing the heat transfer fluid effluent;
    means for cooling the captured heat transfer fluid effluent, the means having an inlet, the inlet connected to the sump, the means functioning as the source of heat transfer fluid for the spray nozzles.

16. The apparatus of claim 14, wherein the spray nozzles are fan nozzles.

17. The apparatus of claim 11, wherein the spacing and sizing of the spray nozzles is selected to achieve a heat transfer fluid flow rate near the start of the conveyor in excess of about 9 gal/min/ft$^2$.

18. The apparatus of claim 11, wherein the spacing and sizing of the spray nozzles is selected to pasteurize a metal can containing approximately 11 ounces of contents from an average temperature of approximately 40° F. to above approximately 180° F. within a time of approximately 8.5 to 13 minutes.

19. The apparatus of claim 11, wherein the spacing and sizing of the spray nozzles is selected so that the temperature of the heat transfer fluid effluent does not vary more than about 9° F. in an area where the average temperature of the container contents increases by approximately 20° F. to 140° F.

20. A method for pasteurizing filled food containers having contents to be pasteurized, comprising:
    conveying containers down a direction of a conveyor, the containers having contents to be pasteurized;
    spraying a heat transfer fluid onto the containers having contents to be pasteurized using a plurality of nozzles spaced along the conveyor, the plurality of nozzles forming a row generally parallel to the direction of the conveyor, the row receiving the heat transfer fluid by a pipe, the pipe generally parallel to the direction of the conveyor, the contents of the containers having an initial average temperature; and decreasing the flow rate of the heat transfer fluid as the average temperature of the contents increases, such that the temperature of an effluent of the heat transfer fluid does not vary more than about 9° F. during the time it takes to heat the average temperature of the contents by approximately 20° F. to 140° F., the spacing of the spray nozzles selected so that the flow rate of the heat transfer fluid decreases in the direction of movement of the conveyor.

* * * * *